United States Patent
Lerner et al.

(10) Patent No.: US 7,224,533 B2
(45) Date of Patent: May 29, 2007

(54) OPTICALLY RETRO-REFLECTING SPHERE

(75) Inventors: Scott Lerner, Corvallis, OR (US); Tim R. Koch, Corvallis, OR (US); Ravi Prasad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 10/984,344

(22) Filed: Nov. 8, 2004

(65) Prior Publication Data

US 2006/0098272 A1 May 11, 2006

(51) Int. Cl.
G02B 5/126 (2006.01)
G02B 17/00 (2006.01)
G02B 3/00 (2006.01)

(52) U.S. Cl. .................. 359/652; 359/726; 359/534

(58) Field of Classification Search .......... 359/534, 359/529, 515, 546, 536, 542, 664, 652–654
See application file for complete search history.

(56) References Cited

U.S. PATENT DOCUMENTS

| | | | | |
|---|---|---|---|---|
| 1,959,090 A | * | 5/1934 | Wood | 40/615 |
| 2,243,434 A | * | 5/1941 | Menke | 359/542 |
| 2,407,680 A | * | 9/1946 | Palmquist et al. | 359/538 |
| 3,919,031 A | * | 11/1975 | White | 156/219 |
| 4,422,733 A | | 12/1983 | Kikuchi et al. | |
| 4,848,882 A | * | 7/1989 | Suzuki et al. | 359/652 |
| 4,851,664 A | | 7/1989 | Rieger | |
| 4,889,409 A | * | 12/1989 | Atcheson | 359/534 |
| 4,935,630 A | | 6/1990 | Merchant | |
| 5,047,776 A | | 9/1991 | Baller | |
| 5,357,371 A | * | 10/1994 | Minott | 359/534 |
| 5,903,391 A | * | 5/1999 | Toshima et al. | 359/599 |
| 6,346,311 B1 | | 2/2002 | Yeo et al. | |
| 6,842,282 B2 | * | 1/2005 | Kuroda et al. | 359/449 |
| 7,036,944 B2 | * | 5/2006 | Budd et al. | 359/536 |

FOREIGN PATENT DOCUMENTS

| | | | |
|---|---|---|---|
| CH | GB 1477175 A * | 6/1977 |
| GB | 1 477 175 A | 6/1977 |
| JP | 2000-075115 A | 3/2000 |
| JP | 2000075115 A * | 3/2000 |
| WO | WO 2005/022210 A | 3/2005 |
| WO | WO 2005022210 A1 * | 3/2005 |

* cited by examiner

*Primary Examiner*—Jordan Schwartz
*Assistant Examiner*—James C. Jones

(57) ABSTRACT

An optically retro-reflecting sphere includes an inner sphere and an outer concentric spherical shell, and can be coupled to a reflective surface. Light entering the optically retro-reflecting sphere from an incident direction is reflected by the sphere generally towards an exit direction, where the exit direction is parallel and opposite to the incident direction. The inner sphere and outer shell have different refractive indices, selected so that the reflected light is reflected with a non-uniform angular distribution about the exit direction.

22 Claims, 5 Drawing Sheets

OPTICALLY RETRO-REFLECTING SPHERE

BACKGROUND

The present invention relates generally to optical lenses. More particularly, the present invention relates to optical retro-reflectors.

Retro-reflective surfaces prove useful in a variety of applications, including projector screens, highway signs, road markings, safety marking, and surveying instruments. For example, by modifying the retro-reflectance properties of a projector screen, brighter images can be obtained at desired viewing angles without increasing the output power of the projector.

One known way to provide a retro-reflective surface is to coat the surface with a large number of small glass spheres or "micro-spheres." These micro-spheres typically have dimensions of about 1 micrometer to 50 micrometers, and a refractive index relatively high as compared to air. The micro-spheres are typically attached to the surface using a reflective binder. The performance of micro-sphere based retro-reflectors can be poor, however, due to low reflection efficiency or limited viewing angles. Although a theoretically ideal spherical lens, known as a Luneburg lens, can provide excellent properties, practical fabrication of such a lens has proven elusive.

One problem with projector screens is that the screen can reflect both the desired projected light and undesired ambient light. Unfortunately, there can be tradeoffs between providing high reflectivity (sometimes called "screen gain"), wide viewing angle, and ambient light rejection (sometimes called "contrast"). Various manufacturers have gone to great lengths to improve these various screen particles. For example, one approach uses a combination of spherical and ellipsoidal particles to enhance the viewing angle.

Hence, what is needed is an improved technology for providing a highly reflective surface with desired retro-reflectivity properties.

SUMMARY

It has been recognized that it would be advantageous to develop an optically retro-reflecting sphere having improved control of reflective properties. Accordingly, an optically retro-reflecting sphere has been developed which includes an inner sphere and an outer concentric spherical shell, and can be coupled to a reflective surface. The inner sphere and outer shell have different refractive indices. Light entering the optically retro-reflecting sphere from an incident direction is reflected by the sphere generally towards an exit direction, where the exit direction is parallel and opposite to the incident direction. In particular, the reflected light is reflected with a non-uniform angular distribution about the exit direction. The refractive indices of the inner sphere and outer shell are selected to provide the desired non-uniform angular distribution.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Figure 1:
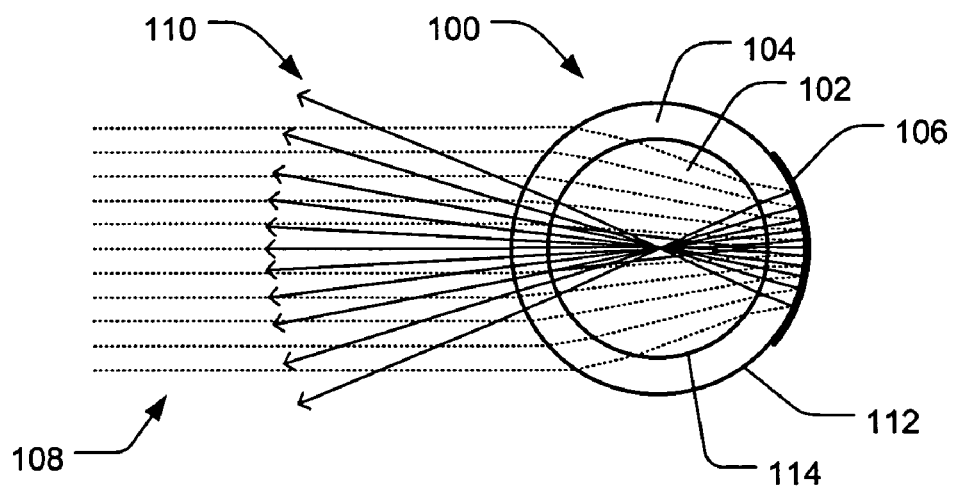
FIG. 1 is an illustration of an optically retro-reflecting sphere in accordance with an embodiment of the present invention.

FIG. 1 provides an illustration of an optically retro-reflecting sphere in accordance with an embodiment of the present invention. The optically retro-reflecting sphere 100 includes an inner sphere 102 having a first refractive index. The optically retro-reflecting sphere also includes an outer spherical shell 104, concentric with the inner sphere, having a second refractive index. The optically retro-reflecting sphere 100 can be coupled to a reflective surface 106. For example the optically retro-reflecting sphere can be attached to a reflective backing, or a reflective layer can be coated onto a portion of the outer surface of the optically retro-reflecting sphere. It is not essential that the optically retro-reflecting sphere is in contact with the reflecting surface; it can be placed in near proximity to a reflecting surface to achieve the same effect.

When a light beam 108 impinges upon the optically retro-reflecting sphere 100, it is refracted at each boundary between different refractive indices. Specifically, refraction occurs at the air to outer shell interface 112, and at the interface between the outer shell and inner shell 114. As is known in the art, the amount of refraction depends on the relative refractive indices and the angle at which the light beam strikes the surface. The combination of the inner sphere 102 and outer shell 104 thus cause the light beam to become either convergent or divergent. After passing through the optically retro-reflecting sphere, the light beam is reflected by the reflective surface 106, and passes back through the optically retro-reflecting sphere, forming an exit beam 110.

Generally, the direction of exit beam 110 will be approximately opposite to the incident light beam 108, but depending on the refractive indices of the inner sphere and outer shell, the exit beam may be divergent. More specifically, the first and second refractive indices can be selected so as to provide a non-uniform angular distribution of the exit beam. For example, the refractive indices may be chosen so that the exiting light beam is more highly concentrated in directions roughly parallel to the incident direction, with less intensity in directions at greater angles relative to the exit direction, as illustrated in FIG. 1.

Figure 2:
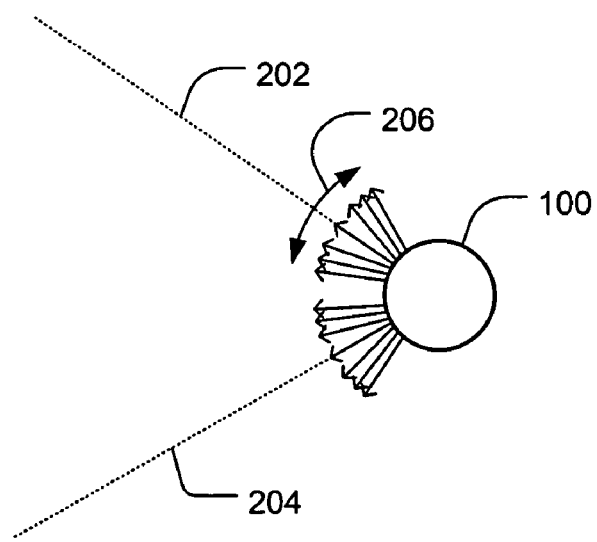
FIG. 2 illustrates retro-reflection from the optically retro-reflecting sphere of FIG. 1.

FIG. 2 provides an exemplary illustration of retro-reflection from the retro-reflecting sphere of FIG. 1. Two light beams 202, 204 impinge upon the sphere 100 from different directions. Each light beam is reflected back in an exit direction roughly opposite to the incident direction. For example, the first light beam 202 is reflected back with an angular spread 206 about the exit direction. The intensity of the light is non-uniform within the angular spread.

In contrast, one previously known retro-reflector uses a micro-sphere of constant refractive index of approximately 2. A sphere with a refractive index of 2 theoretically results in focusing of an incident beam at a spot on the back surface of the micro-sphere, which by reflection back through the micro-sphere results in a perfect retro-reflector. For a refractive index of less than approximately 2, the beam is under-focused, resulting in a divergent beam exiting the micro-sphere. Conversely, for a refractive index of greater than approximately 2, the beam is over focused, also resulting in a divergent beam. In other words, when the refractive index is different than approximately 2, the divergent beam is a cone of light, with an angular spread determined by the amount of focusing (determined by the refractive index of the micro-sphere). In either defocused case, the exit beam has a substantially uniform intensity at all angles with the angular spread. Of course, in practice, such focussing is not exactly perfect, due to the presence of higher order wavefront aberrations that may subtly degrade the focussing process as just described.

Figure 3:
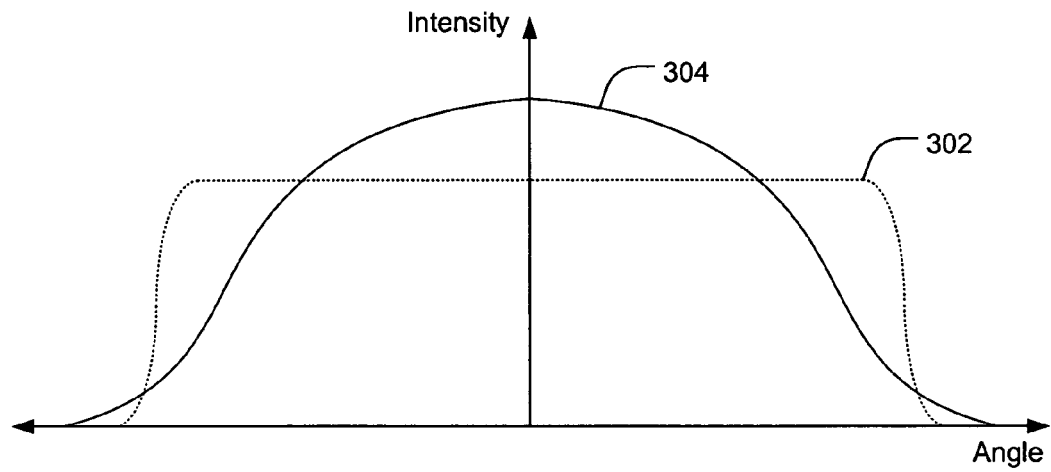
FIG. 3 is a plot of the retro-reflection profile for two different retro-reflectors.

This difference is illustrated in FIG. 3, which provides a plot of retro-reflection profile for two different retro-reflectors. The retro-reflection profile is the intensity of the reflected beam as a function of angle relative to the incident beam. In FIG. 3, the center of the horizontal axis corresponds to the exit direction (which is substantially opposite to the incident direction). Curve 302 shows the retro-reflection intensity distribution for a retro-reflector implemented with a constant index micro-sphere as previously known. It can be seen that the exit beam has a substantially uniform intensity over a range of the angles. Slight deviations may of course be observed due to the effects of diffraction and abberation. This angular range is determined principally by the index of refraction of the retro-reflector. In the constant index micro-sphere retro-reflector one variable, namely the index of refraction of the micro-sphere, controls the beam intensity profile. In contrast, curve 304 illustrates the retro-reflection intensity profile for a retro-reflector in accordance with the principles of the present invention. It can be seen that the exit beam intensity is not uniform. For example, for the embodiment of FIG. 1, the index of refraction and the thicknesses of the inner sphere and outer shell provide at least three degrees of freedom, giving finer control over the beam intensity profile relative to a constant index micro-sphere retro-reflector. As discussed further below, other embodiments of a retro-reflecting sphere with additional concentric shells can provide more degrees of freedom and therefore a higher degree of control over the reflective profile. In this example, higher intensity is provided at angles most closely aligned with the exit direction. Various other retro-reflection intensity profiles are possible depending on the relative refractive index and thickness of the inner sphere and outer shell. In practice, a virtually unlimited number of different possible retro-reflective profiles may be achieved using different embodiments of the invention as discussed herein.

Figure 4:
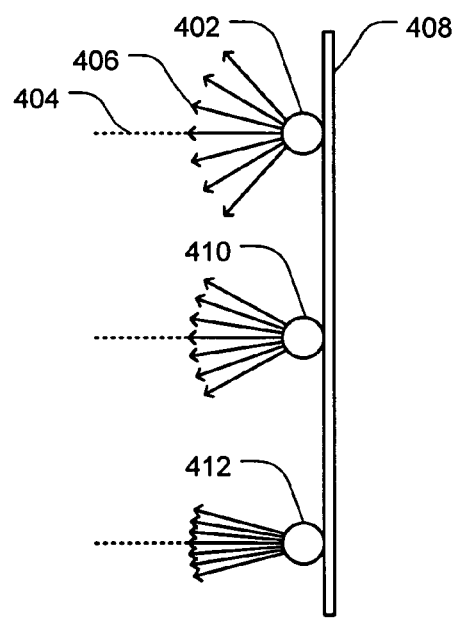
FIG. 4 is an illustration of three retro-reflectors having different retro-reflection profiles in accordance with an embodiment of the present invention.

For example, FIG. 4 illustrates three exemplary retro-reflectors having different retro-reflection profiles. Each of the retro-reflectors 402, 410, 412 is attached to a reflective surface 408, and is tuned to provide a different retro-reflection profile. For example, for the upper most retro-reflector 402, an incident light beam coming from an incident direction 404 is reflected back with a relatively wide angular spread, represented by rays 406. The middle retro-reflector 410, provides a less divergent retro-reflection, and the bottom retro-reflector 412 provides an less divergent exit beam.

In accordance with another embodiment of the present invention, a projection screen can be formed by affixing a plurality of retro-reflecting spheres to a reflective surface. A projection screen can thus be similar to the illustration of FIG. 4, including a reflective surface 408 to which a plurality of retro-reflecting spheres are attached. Both the screen gain (retro-reflection intensity) and viewing angle (exit beam angular spread) can be controlled by adjusting the refractive index properties of the inner sphere and outer shell. The screen can include a plurality of retro-reflecting spheres tuned to have the same reflective properties, or groups of retro-reflecting spheres can be tuned to have different reflective properties. For example, the screen can have a mix of retro-reflecting spheres with a narrow angular spread, to provide high gain, and retro-reflecting spheres with a wide angular spread, to provide wide viewing angle.

Figure 5:
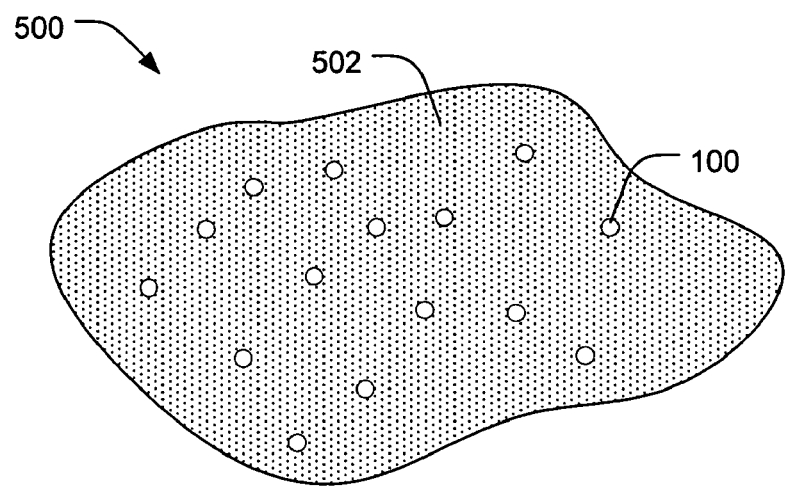
FIG. 5 is an illustration of optically reflective ink in accordance with an embodiment of the present invention.

In accordance with another embodiment of the present invention, an optically reflective ink 500 can be formed by combining a large number of retro-reflecting spheres in a medium as illustrated in FIG. 5. The ink may include a medium 502, in which a plurality of retro-reflecting spheres 100 are suspended. Preferably, the retro-reflecting spheres are between approximately 10 and 100 microns in size. Hence, the ink can be applied to a surface, for example, by using an ink jet printer. Different properties of the ink can be controlled by selecting the properties of the retro-reflecting spheres. For example, as discussed below, the retro-reflecting spheres may be configured as color filters, thus providing color shifting properties to the ink.

Figure 6:
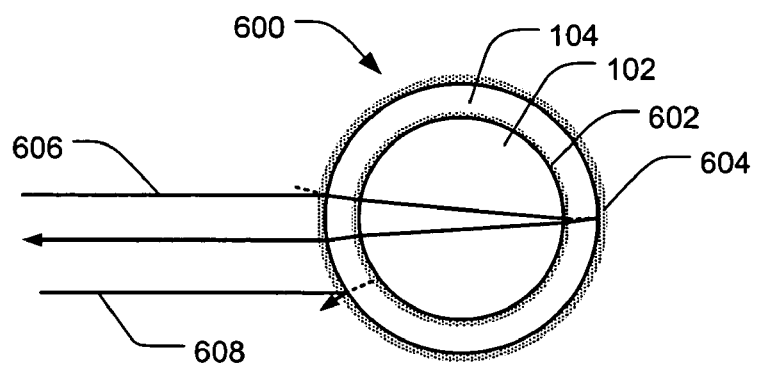
FIG. 6 illustrates an optically retro-reflecting sphere in accordance with another embodiment of the present invention.

In accordance with another embodiment of the present invention, the retro-reflecting sphere may include partially or completely reflective surfaces to modify the reflective properties. For example, FIG. 6 illustrates a retro-reflecting sphere in accordance with another embodiment of the invention. The retro-reflecting sphere 600 includes an inner sphere 102 and outer shell 104 as discussed above. Additionally, an outer surface of the inner sphere is coated with an inner sphere reflective surface 602, and an outer surface of the spherical shell is coated with an outer sphere reflective surface 604. The two reflective surfaces are placed in an optically aligned relationship so as to create an interference filter or etalon. Hence, light of different wavelengths can be selectively allowed to enter the optically retro-reflecting sphere, to provide the retro-reflection property, or be reflected off the retro-reflecting sphere in a non-retro-reflecting manner depending on the wavelength.

More particularly, the different reflective surfaces 602, 604 may be chosen to be either partially or totally reflective. For example, in one embodiment, the inner sphere reflective surface 602 may be totally reflective and the outer shell reflective surface 604 may be partially reflective. In another embodiment, both surfaces may be partially reflective.

The thickness of the outer shell 104, and hence the distance between the inner sphere reflective surface 602 and outer shell reflective surface 604 can be set to be approximately one-quarter wavelength at a desired wavelength of light. Light at this desired wavelength, for example light ray 606 will pass through the outer shell and inner sphere, and be retro-reflected, with little reflection from the outer shell.

Light differing from this desired wavelength, for example light ray 608, however, will be substantially reflected by the outer shell, and thus not undergo retro-reflection. The resulting color filter can be used advantageously for applications including color shifting ink and high contrast screens.

For example, in a red-green-blue projector system, the screen can include a plurality of optically retro-reflecting spheres, with three subsets of the spheres each tuned for red, green, and blue. Hence, light from the projector will be strongly retro-reflected by the screen, providing high gain. Ambient light, being generally white, will tend to be reflected by the curved front surface of the spheres, providing a relatively diffuse, and thus low gain, reflection. Accordingly, the contrast of the screen can be enhanced relative to previously known techniques.

Figure 7:
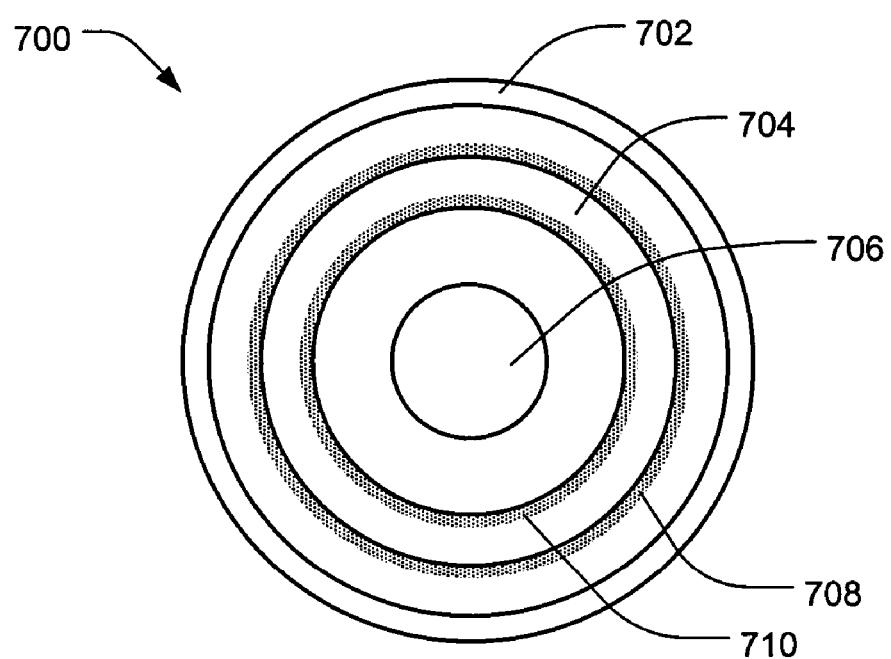
FIG. 7 illustrates an optically retro-reflecting sphere in accordance with yet another embodiment of the present invention.

An optically retro-reflecting sphere need not be limited to an inner sphere and outer shell. FIG. 7 illustrates an optically retro-reflecting sphere in accordance with another embodiment of the present invention. The optically retro-refluxing sphere 700 includes a plurality of concentric spherical shells, each shell having a substantially constant refractive index. For example, FIG. 7 shows an outermost concentric spherical shell 702, several inner concentric spherical shells 704, and an innermost spherical shell 706. The refractive indices of the shells can be chosen to approximate a continuous gradient refractive index corresponding to a retro-reflecting sphere. In particular, the refractive indices can be chosen so that light entering the apparatus from an incident direction exits the apparatus with a non-uniform angular distribution substantially centered around an exit direction parallel and opposite to the incident direction.

In accordance with another embodiment of the present invention, at least two surfaces of the plurality of concentric shells may also be reflective, where at least one of the two surfaces is partially reflective. For example, two inner surfaces 708, 710 can be reflective as shown in FIG. 7. As described above, this can provide an interference filter effect on light entering the optically retro-reflecting sphere. As for embodiments discussed above, the refractive indices and thickness of the concentric shells can be selected so as to provide a desired retro-reflection intensity profile. Of course, a multi-layer optically retro-reflecting sphere may be used in any of the embodiments described above.

In accordance with another embodiment of the present invention, the spherical shells need not each have a constant refractive index. Rather, each of the spherical shells may be a gradient index lens. In other words, each shell may have a refractive index which varies continuously in a radial direction.

Figure 8:
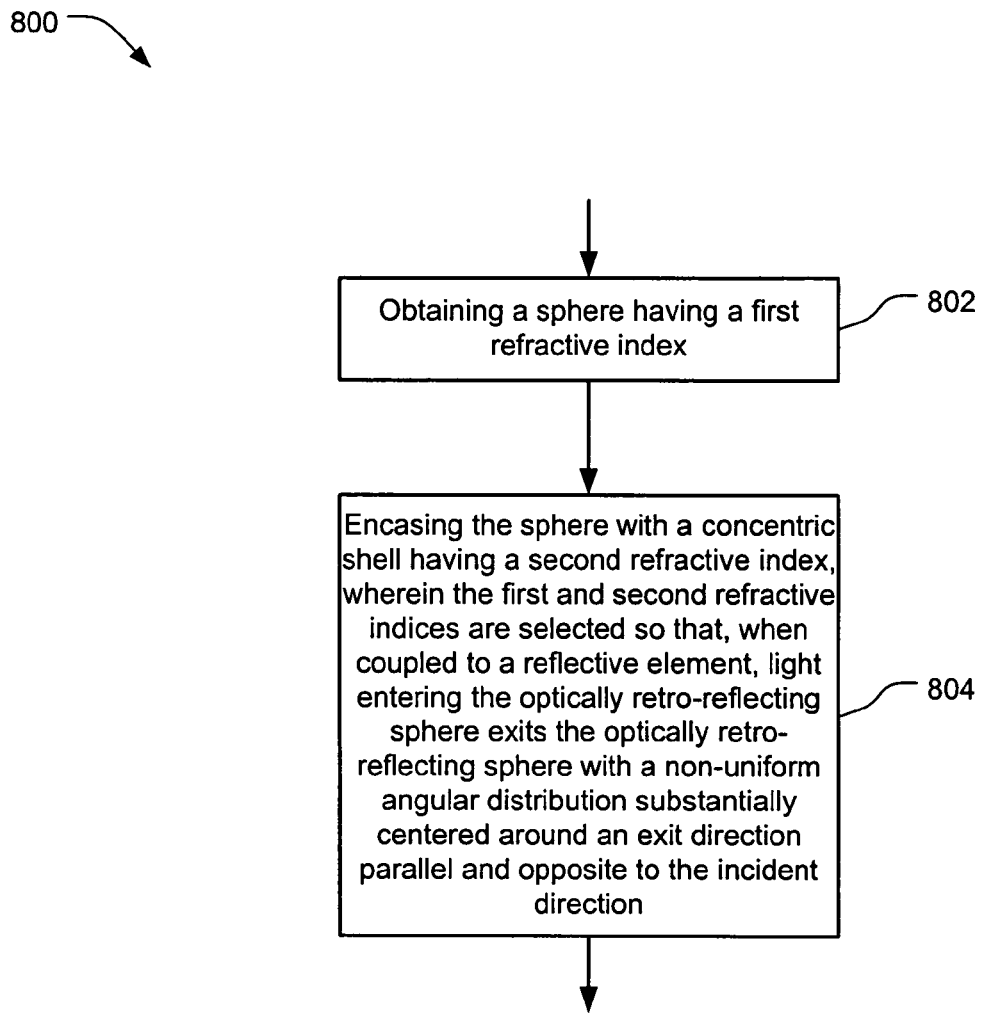
FIG. 8 is a flowchart of a method of making an optically retro-reflecting sphere in accordance with another embodiment of the present invention.

There are various ways of making an optically retro-reflective sphere in accordance with the present invention. For example, one method of making an optically retro-reflecting sphere is illustrated in a flow chart in FIG. 8. The method 800 includes obtaining 802 a sphere having a first refractive index. The method also includes encasing 804 the sphere with a concentric shell having a second refractive index. The first and second refractive indices may be selected so that, when the optically retro-reflecting sphere is coupled to a reflective element, light entering the optically retro-reflecting sphere exits the optically retro-reflecting sphere with a non-uniform angular distribution substantially centered around an exit direction parallel and opposite to the incident direction.

In other embodiments, the method may include repeatedly coating the sphere with concentric shells having different refractive indices. The method may also include forming a plurality of optically retro-reflecting spheres by repeating the preceding steps. The method may include applying full or partially reflective layers to surfaces within the optically retro-reflecting sphere. The method may also include attaching the sphere to a reflective surface. The method may further include attaching a plurality of spheres to a screen substrate to form a projection screen. As discussed above, the screen gain and viewing angle are related to the non-uniform angular distribution. Finally, the method may also include depositing or suspending the plurality of spheres in a medium to form an optically reflective ink.

Summarizing and reiterating to some extent, an optically retro-reflecting sphere has been invented which allows a wide degree of control in the retro-reflecting properties. The optically retro-reflecting sphere can include multiple concentric spherical shells (and an innermost sphere), where the refractive indices of the shells (and innermost sphere) are selected to provide a desired retro-reflection profile. In particular, greater degrees of freedom are provided relative to constant index micro-spheres of the prior art, in that the retro-reflection profile may be non-uniform. This greater degree of freedom may prove particularly useful in the fabrication of projection screens, specialized inks, and other applications. For example, a projection screen can be formed by affixing a plurality of the optically retro-reflecting spheres to a screen substrate to provide a projection screen with a desired screen gain and viewing angle.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An optically retro-reflecting sphere apparatus comprising:
   an inner sphere having a first refractive index; and
   an outer concentric spherical shell having a second refractive index differing from the first refractive index, a reflective surface coupled to the retro-reflective sphere apparatus, wherein the first and second indices are selected so that light entering the optically retro-reflecting sphere from an incident direction exits the optically retro-reflecting sphere with a non-uniform angular distribution substantially centered around an exit direction parallel and opposite to the incident direction.

2. The apparatus of claim 1, further comprising a reflective surface placed in near proximity to a portion of the outer concentric spherical shell.

3. The apparatus of claim 1, wherein an outer surface of the inner sphere is coated with an inner sphere reflective surface and the outer surface of the spherical shell is coated with an outer sphere reflective surface so as to create an interference filter effect on light entering the optically retro-reflective sphere.

4. The apparatus of claim 1, wherein the inner sphere reflective surface is partially reflective.

5. The apparatus of claim 1, wherein the inner sphere reflective surface is totally reflective.

6. The apparatus of claim 1, wherein the outer sphere reflective surface is partially reflective.

7. The apparatus of claim 1, wherein the spherical shell has a spherical shell thickness selected to provide an interference filter effect on light entering the optically retro-reflecting sphere.

8. The apparatus of claim 1, further comprising a plurality of outer concentric spherical layers, each having a refractive index selected so that light entering the optically retro-reflecting sphere from an incident direction is refracted at a boundary of each pair of adjacent concentric spherical layers.

9. The apparatus of claim 1, further comprising:
an ink medium; and
a plurality of the optically retro-reflecting spheres, suspended within the ink medium.

10. An optically retro-reflecting sphere apparatus comprising:
a plurality of concentric spherical shells, each shell having a substantially constant refractive index, a reflective surface coupled to the retro-reflecting sphere apparatus, wherein the refractive indices of the shells are chosen to approximate a continuous gradient refractive index profile corresponding to a retro-reflecting sphere so that light entering the apparatus from an incident direction exits the apparatus with a non-uniform angular distribution substantially centered around an exit direction parallel and opposite to the incident direction.

11. The apparatus of claim 10 further comprising a reflective surface in close proximity to the outermost of the plurality of concentric spherical shells.

12. The apparatus of claim 10 wherein at least two surfaces of the plurality of concentric spherical shells are reflective and at least one of the at least two reflective surfaces is partially reflective so as to create an interference filter effect on light entering the optically retro-reflecting sphere.

13. An optically retro-reflecting sphere apparatus comprising:
a first optically refractive means for refracting light; and
a second optically refractive means for refracting light disposed spherically and concentrically about the first optically refractive means, a reflective surface coupled to the retro-reflecting sphere apparatus, wherein the first optically refractive means and the second optically refractive means cooperate to optically refract light entering the apparatus so that light entering the apparatus from an incident direction exits the apparatus with a non-uniform angular distribution substantially centered about an exit direction parallel and opposite to the incident direction.

14. An optically retro-reflecting sphere apparatus comprising:
a plurality of concentric spherical shells, each shell having a refractive index which varies continuously in a radial direction, a reflective surface coupled to the retro-reflecting sphere apparatus, wherein the refractive indices of the shells are chosen so that light entering the apparatus from an incident direction exits the apparatus with a non-uniform angular distribution substantially centered around an exit direction parallel and opposite to the incident direction.

15. An optically reflective ink comprising:
a plurality of optically retro-reflective spheres, each sphere comprising,
an inner sphere having a first refractive index,
an outer concentric spherical shell having a second refractive index differing from the first refractive index, a reflective surface coupled to the outer concentric spherical shell, wherein the first and second indices are selected so that light entering the optically retro-reflecting sphere from an incident direction exits the optically retro-reflecting sphere with a non-uniform angular distribution substantially centered around an exit direction parallel and opposite to the incident direction; and
an ink medium, wherein the plurality of optically retro-reflective spheres are suspended within the medium.

16. A reflective apparatus comprising:
a reflective substrate; and
a plurality of optically retro-reflective spheres, each sphere comprising,
an inner sphere having a first refractive index, and
an outer concentric spherical shell having a second refractive index differing from the first refractive index, the reflective substrate is coupled to the outer concentric spherical shell, wherein the first and second indices are selected so that light entering the optically retro-reflecting sphere from an incident direction exits the optically retro-reflecting sphere with a non-uniform angular distribution substantially centered around an exit direction parallel and opposite to the incident direction.

17. A method of making an optically retro-reflecting sphere comprising:
a. obtaining a sphere having a first refractive index; and
b. encasing the sphere with a concentric shell having a second refractive index, coupling a reflective element to the concentric shell, wherein the first and second refractive indices are selected so that light entering the optically retro-reflecting sphere exits the optically retro-reflecting sphere with a non-uniform angular distribution substantially centered around an exit direction parallel and opposite to the incident direction.

18. The method of claim 17 further comprising:
c. repeating step (b) to form a plurality of outer concentric shells.

19. The method of claim 17 further comprising:
e. applying a first reflective layer to the optically retro-reflecting sphere; and
f. applying a second partially reflective layer within the optically retro-reflecting sphere in an optically aligned relationship with the first reflective layer so as to create an interference filter.

20. The method of claim 17 further comprising
g. repeating steps (a) and (b) to form a plurality of optically retro-reflecting spheres; and
h. affixing the plurality of optically retro-reflecting spheres to a reflecting surface.

21. The method of claim 20 wherein affixing the plurality of optically retro-reflecting spheres to a reflective element further comprises attaching the plurality of optically retro-reflecting spheres to a screen substrate to form a projection screen whereby a screen gain and viewing angle are related to the non-uniform angular distribution.

22. The method of claim 17 further comprising
i. repeating steps (a) and (b) to form a plurality of optically retro-reflecting spheres; and j. including the plurality of spheres in an ink medium to form an optically reflective ink.

* * * * *